(12) United States Patent
Chang

(10) Patent No.: US 6,422,583 B1
(45) Date of Patent: Jul. 23, 2002

(54) LINK MECHANISM PREVENTING BICYCLE FROM INCLINING FORWARD

(76) Inventor: Wen-Pin Chang, P.O. Box 55-124, Taichung (TW)

( * ) Notice: Subject to any disclaimer, the term of this patent is extended or adjusted under 35 U.S.C. 154(b) by 0 days.

(21) Appl. No.: 09/820,833

(22) Filed: Mar. 30, 2001

(51) Int. Cl.[7] .............................................. B62K 25/08
(52) U.S. Cl. ................................. 280/276; 280/124.104
(58) Field of Search .............................. 280/275, 276, 280/277, 124.104

(56) References Cited

U.S. PATENT DOCUMENTS

| | | | |
|---|---|---|---|
| 4,997,197 A | * 3/1991 | Shultz | 280/124.177 |
| 5,431,426 A | * 7/1995 | Ijams et al. | 280/124.104 |
| 5,775,454 A | * 7/1998 | Scherbarth et al. | 180/219 |
| 6,260,869 B1 | * 7/2001 | Hanlon et al. | 188/26 |
| 2001/0026058 A1 | * 10/2001 | Ito et al. | 280/276 |

FOREIGN PATENT DOCUMENTS

| | | | | |
|---|---|---|---|---|
| DE | 38 33 880 A1 | * 4/1990 | ........... | B62K/25/04 |
| JP | 06099874 A | * 4/1994 | ........... | B62K/25/16 |

* cited by examiner

Primary Examiner—Kevin Hurley

(57) ABSTRACT

A link mechanism for a bicycle includes a push member, a force bearing link, and two arm plates. The push member has a first end pivoted with a pivot base which is connected with the steering tube of the bicycle. The force bearing link has a first end pivoted with a second end of the push member. Each arm plate has a first end connected with a second end of the force bearing link and a second end pivoted with a connecting arm which is mounted the front wheel axle of the bicycle. In such a manner, the inertia action applied by the front wheel on the brake drives the push member to push the steering tube to reduce the compression extent of the vibration absorber of the front wheel of the bicycle, thereby preventing the bicycle from inclining forward violently, so as to enhance the riding safety.

12 Claims, 5 Drawing Sheets

LINK MECHANISM PREVENTING BICYCLE FROM INCLINING FORWARD

BACKGROUND OF THE INVENTION

1. Field of the Invention

The present invention relates to a link mechanism for preventing a bicycle from inclining forward, and more particularly to a link mechanism that can reduce the contract amount of the shock absorber, thereby preventing the bicycle from inclining forward too violently, so as to enhance the riding safety of the bicycle.

2. Description of the Related Art

A conventional bicycle in accordance with the prior art shown in FIG. 1 comprises a front wheel 80, a brake 81, and a shock absorber 82. When the moving front wheel 80 of the bicycle is braked by the brake 81, the shock absorber 82 is contracted to eliminate the inertia action of the moving bicycle, so that the front part of the bicycle easily inclines forward. However, if the bicycle is moving at a high speed, or moving along a sloped road, the inertia action of the moving bicycle will cause the front part of the bicycle to incline forward too violently when the front wheel 80 is braked by the brake 81, so that the rider easily falls down, thereby causing danger to the rider.

SUMMARY OF THE INVENTION

The primary objective of the present invention is to provide a link mechanism for preventing a bicycle from inclining forward, wherein the rotation inertia action of the front wheel forces the brake to drive the force bearing link to force the push member to push the steering tube, so as to reduce the contract amount of the shock absorber, thereby preventing the bicycle from inclining forward too violently, so as to enhance the riding safety.

In accordance with the present invention, there is provided a link mechanism for preventing a bicycle from inclining forward, comprising:

a push member having a first end pivoted with a pivot base which is connected with a steering tube of a bicycle, the push member having two support levers;

a force bearing link having a first end pivoted with a second end of the push member, the force bearing link having two side levers, the force bearing linking provided with two stubs fitted with a brake so that the brake is mounted on the force bearing link; and two arm plates each having a first end connected with a second end of the force bearing link and a second end pivoted with a connecting arm, each connecting arm pivoted on one of two ends of a wheel axle of a front wheel of the bicycle;

wherein, an Inertia action applied by the front wheel on the brake drives the push member to push the steering tube to reduce a compression extent of a vibration absorber of the front wheel of the bicycle, thereby preventing the bicycle from inclining forward too violently, to enhance a riding safety.

Further benefits and advantages of the present invention will become apparent after a careful reading of the detailed description with appropriate reference to the accompanying drawings.

DETAILED DESCRIPTION OF THE INVENTION

Figure 1:
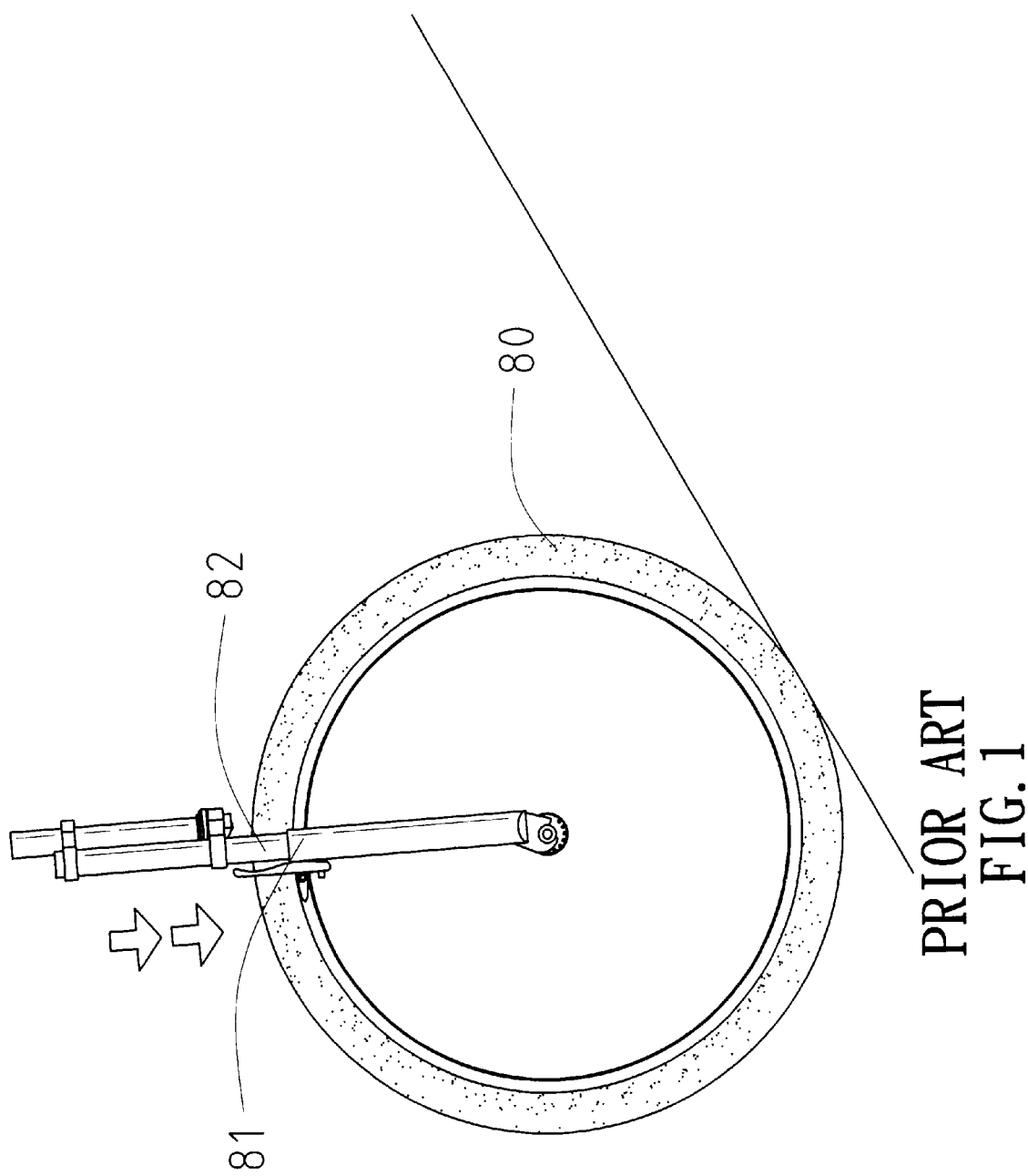
FIG. 1 is a side plan schematic operational view of a front wheel of a conventional bicycle in accordance with the prior art.
Figure 2:
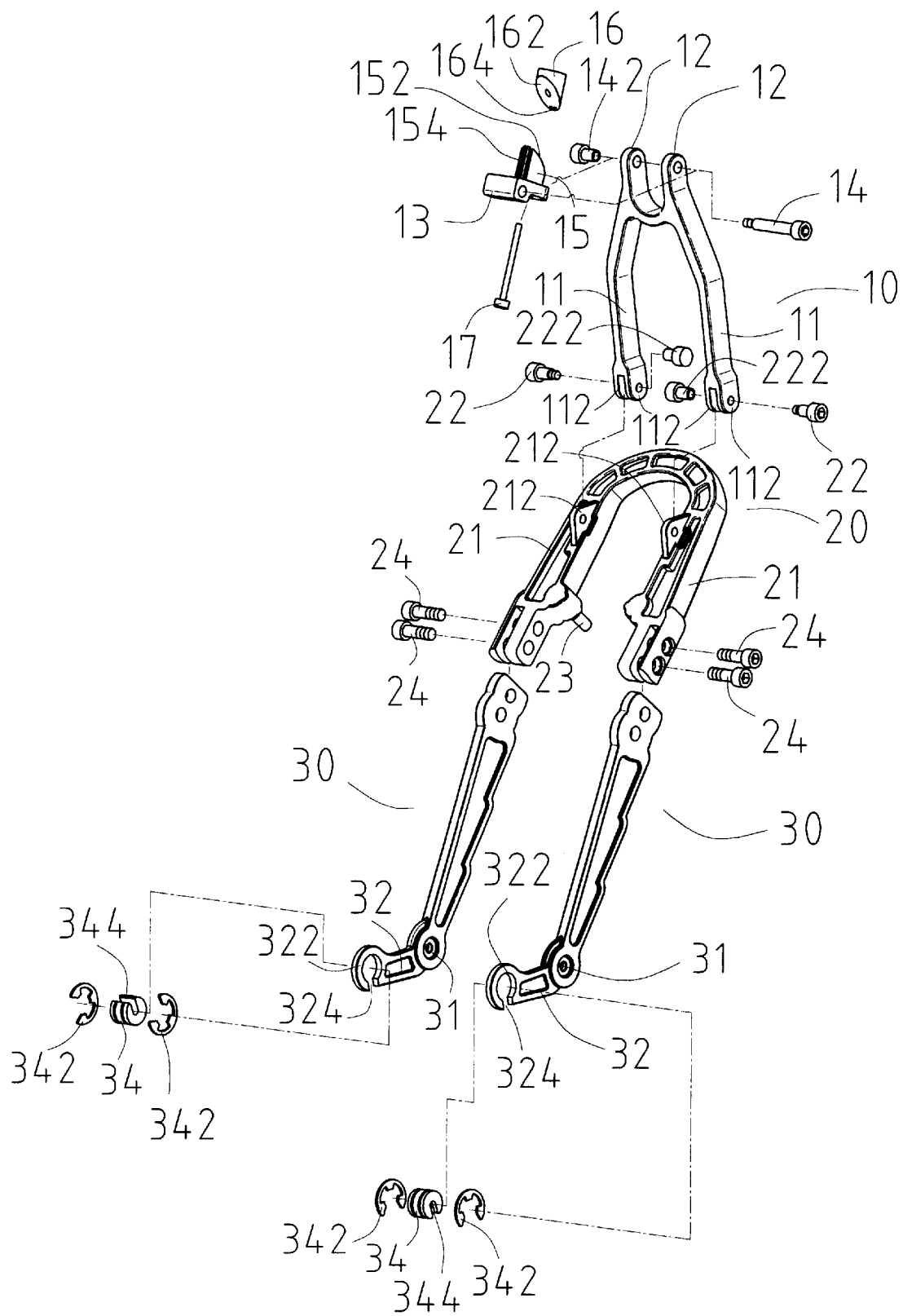
FIG. 2 is an exploded perspective view of a link mechanism for preventing a bicycle from inclining forward in accordance with the present invention.
Figure 3:
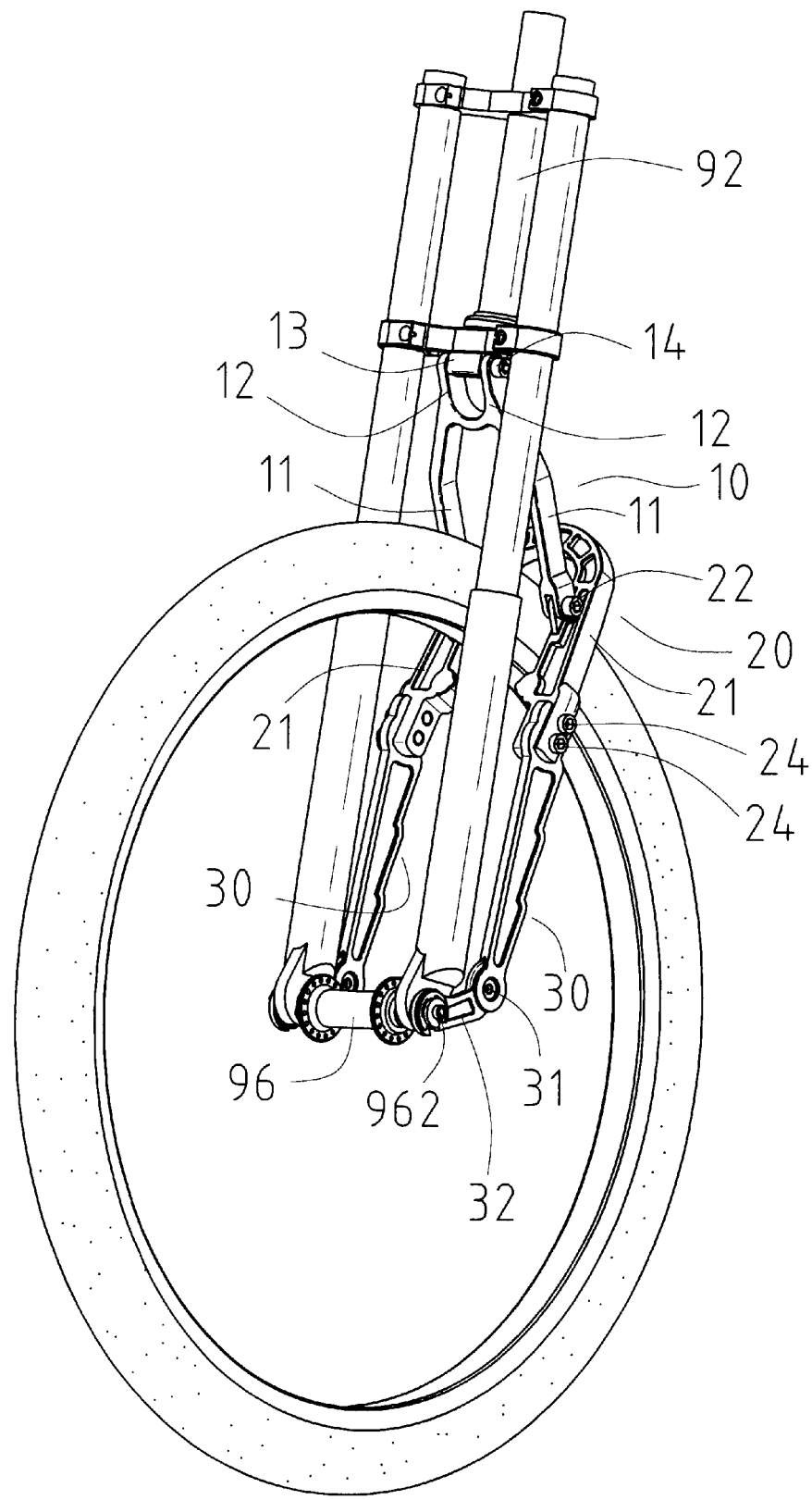
FIG. 3 is a perspective assembly view of the link mechanism for preventing a bicycle from inclining forward as shown in FIG. 2.

Referring to the drawings and initially to FIGS. 2 and 3, a link mechanism for preventing a bicycle from inclining forward in accordance with the present invention comprises a push member 10, a force bearing link 20, and two arm plates 30.

The push member 10 has a first end pivoted with a pivot base 13 which is connected with the steering tube 92 of the bicycle. The push member 10 includes two opposite support levers 11 which are integrally connected at the top end thereof.

The force bearing link 20 has a first end pivoted with the second end of the push member 10. The force bearing link 20 includes two opposite side levers 21 which are integrally connected at the top end thereof. The force bearing linking 20 is provided with two stubs 23 fitted with a brake 95 (see FIG. 5) so that the brake 95 is mounted on the force bearing link 20.

Each of the two arm plates 30 has a first end connected with the second end of the force bearing link 20, and a second end pivoted with a connecting arm 32. Each connecting arm 32 is pivoted on one of two ends of a wheel axle 962 of the front wheel 91 (see FIG. 4) of the bicycle.

By such an arrangement, the inertia action applied by the front wheel 91 on the brake 95 drives the push member 10 to push the steering tube 92 so as to reduce the compression extent of the vibration absorber 93 (see FIGS. 4 and 5) of the front wheel 91 of the bicycle, thereby preventing the bicycle from inclining forward too violently, so as to enhance the riding safety.

The first end of the push member 10 is provided with two opposite spaced ear plates 12. The pivot base 13 is pivoted between the two ear plates 12 of the push member 10. A bolt 14 is extended through the two ear plates 12 and the pivot base 13, such that the pivot base 13 is pivoted on the push member 10. A threaded tube 142 is screwed on the distal end of the bolt 14.

The pivot base 13 is protruded with a first support block 15 which is received in the steering tube 92 of the bicycle. The first support block 15 has a top end formed with a first oblique slide face 152. A second support block 16 is received in the steering tube 92, and is laminated on the first support block 15. The second support block 16 has a bottom end formed with a second oblique slide face 162 rested on the first oblique slide face 152 of the first support block 15. A bolt 17 is in turn extended through the first support block 15 and the second support block 16 for pivoting the first support block 15 and the second support block 16.

When the bolt 17 is rotated, the first support block 15 and the second support block 16 are driven to slide and displace along two different opposite directions by guidance of the first oblique slide face 152 and the second oblique slide face 162 to respectively press the inner wall of the steering tube 92, such that the push member 10 is positioned on the steering tube 92.

The periphery of the first support block 15 is formed with a plurality of first ribs 154 for increasing the friction between the first support block 15 and the inner wall of the steering tube 92, thereby enhancing the positioning reliability therebetween. Similarly, the periphery of the second support block 16 is formed with a plurality of second ribs 164 for increasing the friction between the second support block 16 and the inner wall of the steering tube 92, thereby enhancing the positioning reliability therebetween.

Each of the two support levers 11 of the push member 10 has a distal end which is forked with two parallel connecting plates 112. Each of the two side levers 21 of the force bearing link 20 has a front end which is protruded with an insertion plate 212 pivoted between the two connecting plates 112 of a respective support lever 11 of the push member 10. A bolt 22 is extended through the two connecting plates 112 of a respective support lever 11 of the push member 10, and the insertion plate 212 of a respective side lever 21 of the force bearing link 20, such that the force bearing link 20 is pivoted with the push member 10. Each of the bolts 22 is screwed in a threaded tube 222.

Each of the two stubs 23 is formed on a respective side lever 21 of the force bearing link 20 located between the distal end of the side lever 21 and the insertion plate 212, such that the brake 95 is mounted on the force bearing link 20. Preferably, each of the two stubs 23 is formed on the rear edge of the force beating link 20, thereby enhancing the positioning reliability of the brake 95.

Each of the two side levers 21 of the force bearing link 20 has a bottom end pivoted with a respective arm plate 30 by two bolts 24, so that the force bearing link 20 is connected with each arm plate 30. Each oft he two arm plates 30 has a bottom end pivoted with the connecting arm 32 by a pivot axle 31.

The distal end of each connecting arm 32 is extended to the distal end of the front fork tube 94 (see FIG. 5) of the bicycle and defining a fitting hole 322. The fitting hole 322 has a wall defining a first opening 324 which has a width smaller than the inner diameter of the fitting hole 322. A sleeve 34 is rotatably mounted in the fitting hole 322, and has two sides each secured with a C-shaped snap ring 342 rested on one side of the connecting arm 32 for retaining the sleeve 34 in the fitting hole 322 of the connecting arm 32. The sleeve 34 has a wall radially defining a second opening 344, whereby the wheel axle 962 of the hub 96 (see FIG. 3) of the front wheel 91 of the bicycle in turn passes through the first opening 324 of the fitting hole 322 of the connecting arm 32 and through the second opening 344 into the sleeve 34, such that the connecting arm 32 is pivoted on the wheel axle 962 of the hub 96 of the front wheel 91 of the bicycle.

In assembly, referring to FIGS. 2–5, the first support block 15 is inserted into the steering tube 92 of the bicycle from the bottom thereof. When the bolt 17 is rotated, the first support block 15 and the second support block 16 are driven to displace along two different opposite directions by guidance of the first oblique slide face 152 and the second oblique slide face 162 to respectively press the inner wall of the steering tube 92, such that the push member 10 is positioned on the steering tube 92.

The sleeve 34 is then rotated, so that the opening 324 aligns with the opening 344. Thus, the sleeve 34 can be fitted on the wheel axle 962. The sleeve 34 is then rotated, so that the opening 344 is closed by the wall of the fitting hole 322. Then, the brake 95 is fitted on the stubs 23 of the force bearing link 20, so that the link mechanism in accordance with the present invention is assembled on the bicycle.

The sleeve 34 can be rotated to align the opening 324 the opening 344, whereby the sleeve 34 can be detach from the wheel axle 962, so that the front wheel 91 can be detached easily and conveniently, thereby greatly facilitating maintenance and replacement of the front wheel 91.

Figure 4:
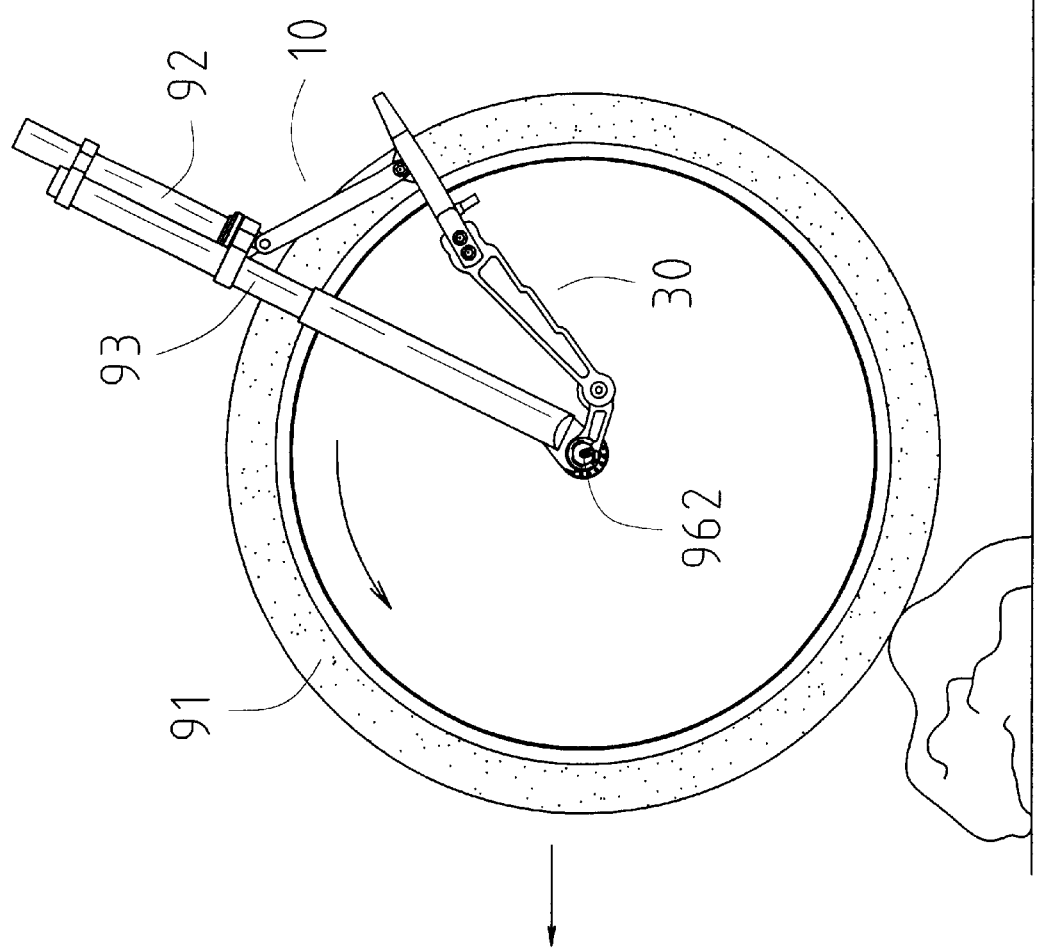
FIG. 4 is a side plan schematic operation view of the link mechanism for preventing a bicycle from inclining forward as shown in FIG. 3.

Referring to FIG. 4, the bicycle is moved on a rugged road. When the front wheel 91 hits the protrusion on the road, the impact force on the front wheel 92 will force the shock absorbers 93 at the two sides of the bicycle to contract, thereby buffering and reducing the impact force. Meanwhile, the distance between the steering tube 92 and the wheel axle 962 is shortened, so that the push member 10 and the arm plates 30 are displaced relative to each other, without affecting action of the shock absorber 93.

Figure 5:
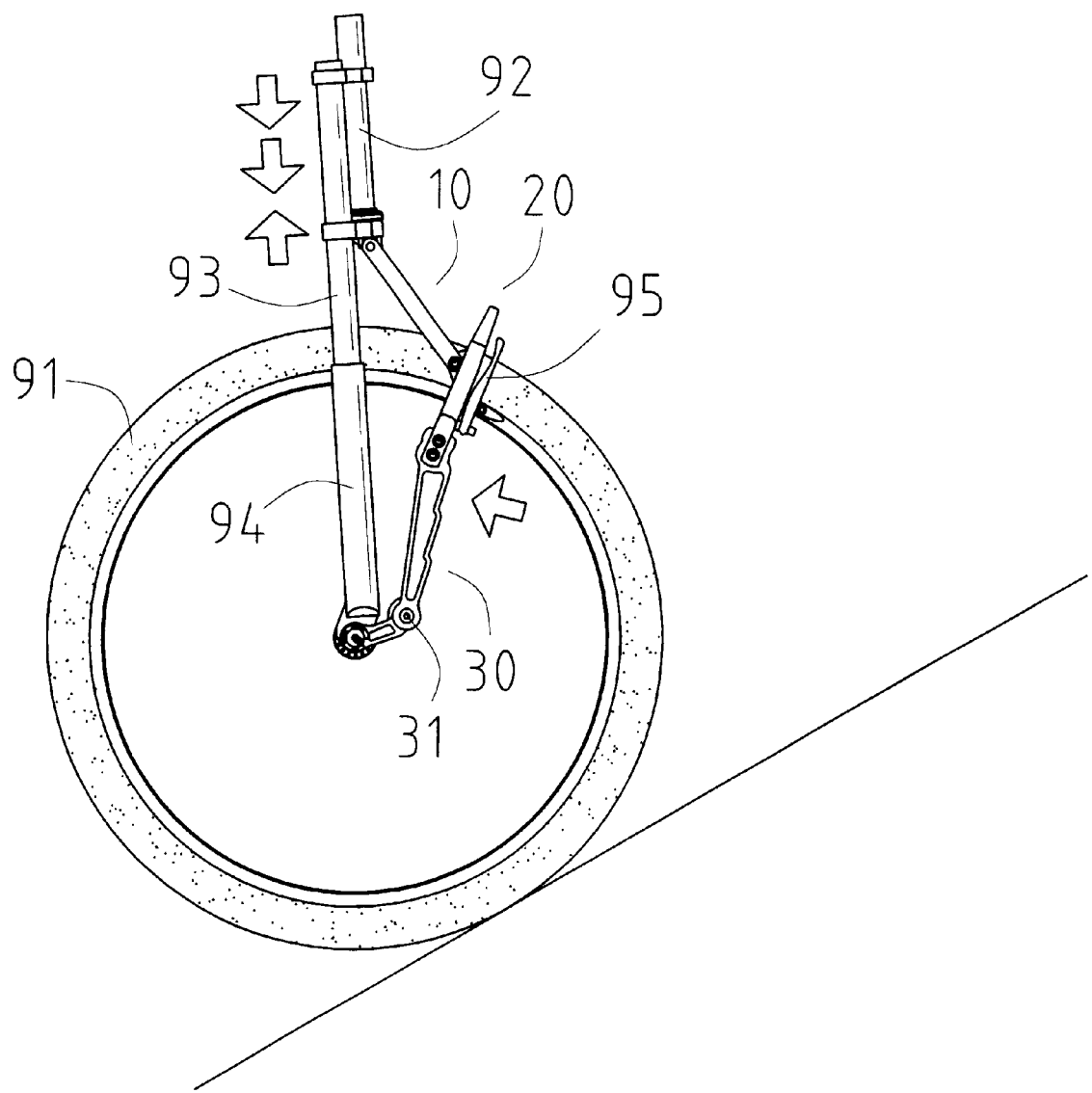
FIG. 5 is a side plan schematic operation view of the link mechanism for preventing a bicycle from inclining forward as shown in FIG. 3.

Referring to FIG. 5, the bicycle is moving downward along a slope. When the brake 95 is operated to clamp the front wheel 91, the rotation inertia action of the front wheel 91 forces the brake 95 to drive the force bearing link 20 and the arm plates 30 to pivot about the pivot axle 31 toward the front fork tube 94. Then, the force bearing link 20 forces the push member 10 to push the steering tube 92, thereby reducing the inertia action of the bicycle. The upward pushing force transmitted by the steering tube 92 reduces the downward force supported by the shock absorber 93, so as to reduce the contract amount of the shock absorber 93, thereby preventing the bicycle from inclining forward too violently, so as to enhance the riding safety.

In addition, the brake 95 is fitted on the stubs 23 of the force bearing link 20, so that the force bearing link 20 forms a support on the brake 95. Thus, when the bicycle is braked to reduce the speed, the force formed by the rotation inertia action of the front wheel 91 on the brake 95 will not affect the positioning effect of the brake 95 by support of the force bearing link 20.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A link mechanism for preventing a bicycle from inclining forward, comprising:

a push member (10) having a first end pivoted with a pivot base (13) which is connected with a steering tube (92) of a bicycle, said push member (10) having two support levers (11);

a force bearing link (20) having a first end pivoted with a second end of said push member (10), said force bearing link (20) having two side levers (21), said force bearing linking (20) provided with two stubs (23) fitted with a brake (95) so that said brake (95) is mounted on said force bearing link (20); and two arm plates (30) each having a first end connected with a second end of said force bearing link (20) and a second end pivoted with a connecting arm (32), each connecting arm (32) pivoted on one of two ends of a wheel axle (962) of a front wheel (91) of said bicycle;

wherein, an inertia action applied by said front wheel (91) on said brake (95) drives said push member (10) to push said steering tube (92), to reduce a compression extent of a vibration absorber (93) of said front wheel (91) of said bicycle, thereby preventing said bicycle from inclining forward too violently, to enhance a riding safety.

2. The link mechanism for preventing a bicycle from inclining forward in accordance with claim 1, wherein said first end of said push member (10) is provided with two opposite spaced ear plates (12), said pivot base (13) is pivoted between said two ear plates (12) of said push member (10), and said link mechanism further comprises a bolt (14) extended through said two ear plates (12) and said pivot base (13), such that said pivot base (13) is pivoted on said push member (10).

3. The link mechanism for preventing a bicycle from inclining forward in accordance with claim 2, further comprising a threaded tube (142) screwed on a distal end of said bolt (14).

4. The link mechanism for preventing a bicycle from inclining forward in accordance with claim 1, wherein said pivot base (13) is protruded with a first support block (15) received in said steering tube (92), said first support block (15) has a top end formed with a first oblique slide face (152), said link mechanism further comprises a second support block (16) received in said steering tube (92), and a bolt (17) in turn extended through said first support block (15) and said second support block (16) for pivoting said first support block (15) and said second support block (16), wherein said second support block (16) has a bottom end formed with a second oblique slide face (162) rested on said first oblique slide face (152) of said first support block (15), and when said bolt (17) is rotated, said first support block (15) and said second support block (16) slide and displace along two different opposite directions by guidance of said first oblique slide face (152) and said second oblique slide face (162) to respectively press an inner wall of said steering tube (92), such that said push member (10) is positioned on said steering tube (92).

5. The link mechanism for preventing a bicycle from inclining forward in accordance with claim 4, wherein said first support block (15) has a periphery formed with a plurality of first ribs (154) for increasing friction between said first support block (15) and said inner wall of said steering tube (92), thereby enhancing a positioning reliability therebetween, and said second support block (16) has a periphery formed with a plurality of second ribs (164) for increasing friction between said second support block (16) and said inner wall of said steering tube (92), thereby enhancing a positioning reliability therebetween.

6. The link mechanism for preventing a bicycle from inclining forward in accordance with claim 1, wherein each of said two support levers (11) of said push member (10) has a distal end forked with two connecting plates (112), each of said two side levers (21) of said force bearing link (20) has a front end protruded with an insertion plate (212) pivoted between said two connecting plates (112) of a respective support lever (11) of said push member (10), and said link mechanism further comprises two bolts (22) each extended through said two connecting plates (112) of a respective support lever (11) of said push member (10), and said insertion plate (212) of a respective side lever (21) of said force bearing link (20), such that said force bearing link (20) is pivoted with said push member (10).

7. The link mechanism for preventing a bicycle from inclining forward in accordance with claim 6, wherein each of said two stubs (23) is formed on a respective side lever (21) of said force bearing link (20) located between a distal end of said side lever (21) and said insertion plate (212), such that said brake (95) is mounted on said force bearing link (20).

8. The link mechanism for preventing a bicycle from inclining forward in accordance with claim 7, wherein each of said two stubs (23) is formed on a rear edge of said force bearing link (20), thereby enhancing a positioning reliability of said brake (95).

9. The link mechanism for preventing a bicycle from inclining forward in accordance with claim 1, wherein each of said two stubs (23) is formed on a rear edge of said force bearing link (20), thereby enhancing a positioning reliability of said brake (95).

10. The link mechanism for preventing a bicycle from inclining forward in accordance with claim 1, wherein each of said two side levers (21) of said force bearing link (20) has a bottom end pivoted with a respective arm plate (30) by two bolts (24), so that said force bearing link (20) is connected with each arm plate (30).

11. The link mechanism for preventing a bicycle from inclining forward in accordance with claim 1, wherein each of said two arm plates (30) has a bottom end pivoted with said connecting arm (32) by a pivot axle (31).

12. The link mechanism for preventing a bicycle from inclining forward in accordance with claim 1, wherein said connecting arm (32) defines a fitting hole (322), said fitting hole (322) has a wall defining a first opening (324) which has a width smaller than an inner diameter of said fitting hole (322), a sleeve (34) is rotatably mounted in said fitting hole (322), and has two sides each secured with a C-shaped snap ring (342) rested on one side of said connecting arm (32) for retaining said sleeve (34) in said fitting hole (322) of said connecting arm (32), said sleeve (34) has a wall radially defining a second opening (344), whereby said wheel axle (962) of said front wheel (91) of said bicycle in turn passes through said first opening (324) of said fitting hole (322) of said connecting arm (32) and through said second opening (344) into said sleeve (34), such that said connecting arm (32) is pivoted on said wheel axle (962) of said front wheel (91) of said bicycle.

* * * * *